United States Patent
Tan

(10) Patent No.: US 11,955,703 B2
(45) Date of Patent: Apr. 9, 2024

(54) ANTENNA AND UNMANNED AERIAL VEHICLE

(71) Applicant: AUTEL ROBOTICS CO., LTD., Guangdong (CN)

(72) Inventor: Jiehong Tan, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 353 days.

(21) Appl. No.: 17/362,931

(22) Filed: Jun. 29, 2021

(65) Prior Publication Data

US 2021/0328331 A1 Oct. 21, 2021

Related U.S. Application Data

(63) Continuation of application No. PCT/CN2019/098816, filed on Aug. 1, 2019.

(30) Foreign Application Priority Data

Dec. 29, 2018 (CN) .......................... 201811639159.2

(51) Int. Cl.
*H01Q 1/28* (2006.01)
*B64C 39/02* (2023.01)
(Continued)

(52) U.S. Cl.
CPC ........... *H01Q 1/286* (2013.01); *B64C 39/024* (2013.01); *H01Q 1/38* (2013.01); *H01Q 9/0457* (2013.01)

(58) Field of Classification Search
CPC ......... H01Q 1/286; H01Q 1/38; H01Q 9/0457
See application file for complete search history.

(56) References Cited

U.S. PATENT DOCUMENTS

2004/0075609 A1\* 4/2004 Li ........................... H01Q 9/38
343/729
2010/0321273 A1\* 12/2010 Kuramoto .............. H01Q 9/285
343/860

(Continued)

FOREIGN PATENT DOCUMENTS

CN 2770116 Y 4/2006
CN 204614953 U 9/2015
(Continued)

OTHER PUBLICATIONS

International Search Report dated Oct. 29, 2019; PCT/CN2019/098816.
(Continued)

*Primary Examiner* — Dieu Hien T Duong
(74) *Attorney, Agent, or Firm* — Frank Gao, esq.

(57) ABSTRACT

The antenna includes a first antenna unit and a second antenna unit. The first antenna unit and the second antenna unit are disposed on the same surface of a substrate. The first antenna unit includes a first primary radiation unit and a first secondary radiation unit, and the second antenna unit includes a second primary radiation unit and a second secondary radiation unit. A gap exists between the first primary radiation unit and the second primary radiation unit. The first secondary radiation unit is connected to one end of the first primary radiation unit that is away from the second primary radiation unit, the second secondary radiation unit is connected to one end of the second primary radiation unit that is away from the first primary radiation unit, and the first secondary radiation unit and the second secondary radiation unit are located on the same side of the substrate.

11 Claims, 4 Drawing Sheets

(51) Int. Cl.
    *H01Q 1/38*    (2006.01)
    *H01Q 9/04*    (2006.01)

(56) References Cited

U.S. PATENT DOCUMENTS

2017/0301978 A1    10/2017    Wu et al.
2020/0106518 A1*    4/2020    Frolov ............... H04B 7/18515

FOREIGN PATENT DOCUMENTS

| CN | 105680169 A | 6/2016 |
| CN | 205335411 U | 6/2016 |
| CN | 107278341 A | 10/2017 |
| CN | 108767435 A | 11/2018 |
| CN | 109494451 A | 3/2019 |
| CN | 209357912 U | 9/2019 |

OTHER PUBLICATIONS

The First Chinese Office Action dated Aug. 30, 2023 Appln. No. 2001811639159.2 with machine translation.

* cited by examiner

ANTENNA AND UNMANNED AERIAL VEHICLE

CROSS-REFERENCE

This application is a continuation of International Application No. PCT/CN2019/098816, filed on Aug. 1, 2019, which claims priority to Chinese Patent Application No. 201811639159.2 filed on Dec. 29, 2018, which is incorporated herein by reference in its entirety.

BACKGROUND

Technical Field

Embodiments of the present invention relate to the technical field of antennas, and in particular, to an antenna and an unmanned aerial vehicle (UAV).

Related Art

Antennas are communication elements configured to transmit or receive electromagnetic waves and are widely used in wireless communication electronic devices. With emergence of robots and UAVs and due to a demand for miniaturization, antennas are continuously miniaturized. UAVs not only have size requirements on antennas as a result of space limitations, but also require the antennas to be capable of uniform omnidirectional radiation.

Existing UAV antennas are generally 2.4 GHz and/or 5.8 GHz microstrip antennas. Low-frequency antennas such as 900 MHz antennas are gradually applied to UAVs due to their desirable receiving gains and anti-interference capabilities. However, such antennas have a relatively large size and therefore need to be placed on an exterior of the UAVs, affecting usage of the antennas.

SUMMARY

A technical problem mainly to be resolved in embodiments of the present invention is to reduce a size of an antenna.

A technical solution adopted by the present invention is to provide an antenna disposed in a UAV. The antenna includes: a first antenna unit; and a second antenna unit, the first antenna unit and the second antenna unit being disposed on the same surface of a substrate (200); where the first antenna unit includes a first primary radiation unit and a first secondary radiation unit, and the second antenna unit includes a second primary radiation unit and a second secondary radiation unit, a gap existing between the first primary radiation unit and the second primary radiation unit; and the first secondary radiation unit is connected to one end of the first primary radiation unit that is away from the second primary radiation unit, the second secondary radiation unit is connected to one end of the second primary radiation unit that is away from the first primary radiation unit, and the first secondary radiation unit and the second secondary radiation unit are located on the same side of the substrate.

Optionally, the first primary radiation unit and the second primary radiation unit are disposed in a first direction of the substrate, and the first secondary radiation unit and the second secondary radiation unit are disposed in a second direction of the substrate, the first direction being not parallel to the second direction.

In an embodiment, the first direction is a vertical direction of the substrate, and the second direction is a horizontal direction of the substrate.

In an embodiment, a distance from the first secondary radiation unit to the second secondary radiation unit gradually decreases in the horizontal direction of the substrate.

In an embodiment, the first primary radiation unit and the second primary radiation unit are symmetrically disposed in the vertical direction of the substrate.

Optionally, the first primary radiation unit is an inverted trapezoidal structure, the second primary radiation unit is a trapezoidal structure, the first secondary radiation unit is formed by extending horizontally one of top corners of the inverted trapezoidal structure, and the second secondary radiation unit is formed by extending obliquely upward one of bottom corners of the trapezoidal structure.

In some embodiments, the first primary radiation unit or the second primary radiation unit has a groove formed thereon, the groove having an opening away from the other primary radiation unit.

Optionally, the antenna further includes a feed line located in the groove.

In an embodiment, the feed line includes an outer conductor and an inner conductor.

The groove is provided in the first primary radiation unit, the inner conductor is connected to one end of the second primary radiation unit that is close to the first primary radiation unit, and the outer conductor is connected to one end of the first primary radiation unit that is close to the second primary radiation unit.

In an embodiment, the first antenna unit and the second antenna unit are both metal sheets.

Embodiments of the present invention further provide a UAV, having a substrate disposed therein, the substrate having the foregoing antenna disposed thereon.

Optionally, the UAV is a vertical take-off and landing fixed-wing UAV.

The substrate and the antenna are disposed in a tail wing of the UAV.

The embodiments of the present invention have the following beneficial effects: different from the related art, the antenna in the embodiments of the present invention includes the first antenna unit and the second antenna unit disposed on the same surface of the substrate. the first antenna unit includes the first primary radiation unit and the first secondary radiation unit, and the second antenna unit includes the second primary radiation unit and the second secondary radiation unit, a gap exists between the first primary radiation unit and the second primary radiation unit, the first secondary radiation unit is connected to one end of the first primary radiation unit that is away from the second primary radiation unit, the second secondary radiation unit is connected to one end of the second primary radiation unit that is away from the first primary radiation unit, and the first secondary radiation unit and the second secondary radiation unit are located on the same side of the substrate, so that a current flowing through the first antenna unit and the second antenna unit has a longer effective path, which reduces a size and a height and/or a width of the antenna, thereby achieving miniaturization of the antenna. In this way, the antenna can be mounted in the UAV.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
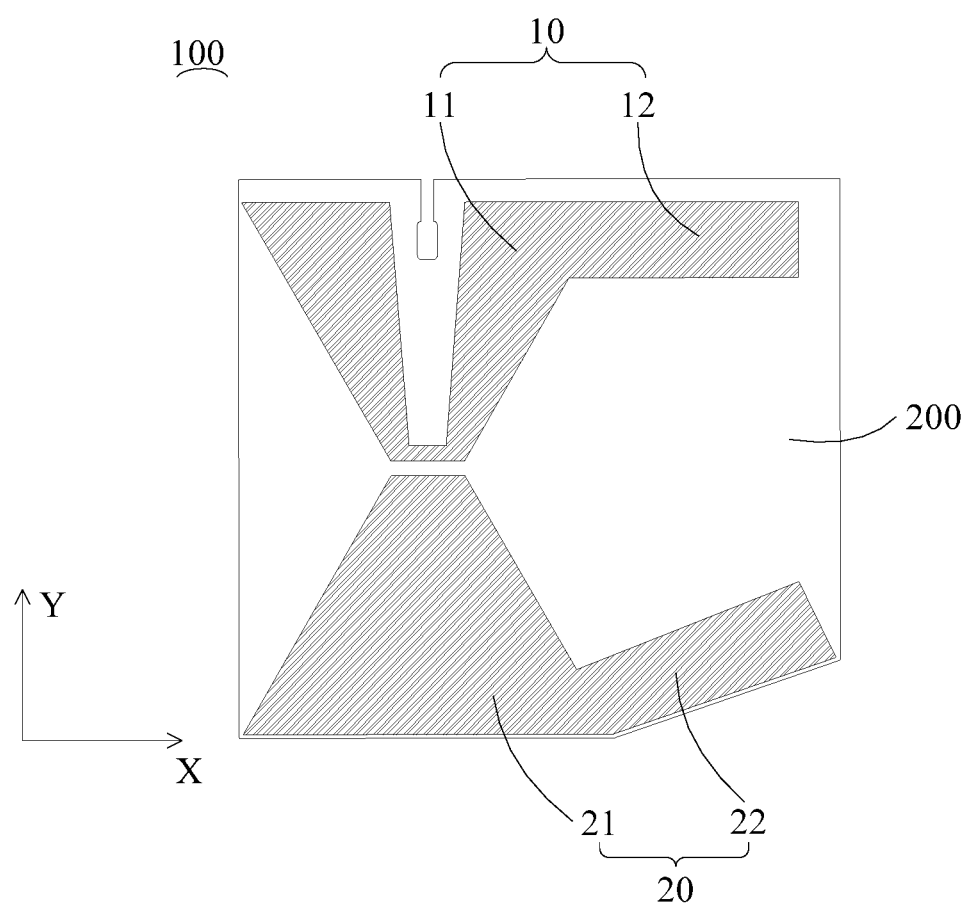
FIG. 1 is a schematic diagram of an antenna according to an embodiment of the present invention.

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions in this specification are merely used for an illustrative purpose.

Unless otherwise defined, meanings of all technical and scientific terms used in this specification are the same as those generally understood by a person skilled in the technical field to which the present invention belongs. Terms used in the specification of the present invention are merely intended to describe objectives of the specific embodiments, and are not intended to limit the present invention. A term "and/or" used in this specification includes any or all combinations of one or more related listed items.

As shown in FIG. 1 to FIG. 4, an embodiment of the present invention provides an antenna 100. The antenna 100 is optionally an omnidirectional antenna. The antenna 100 is mounted in a UAV. The antenna 100 includes a substrate 200 and a first antenna unit 10 and a second antenna unit 20 disposed on the same surface of the substrate 200.

The substrate 200 is an insulating medium, which may be a plastic plate such as a polycarbonate (PC) plate or a substrate made of FR4 grade materials. Specifically, FR4 is a code name of a flame-resistant material grade, which means a material specification requiring a resin material to automatically extinguish after being burned. FR4 is a material grade rather than a material name. There are many types of FR4 grade materials currently in use, such as composite materials made of so-called Tera-Function epoxy resin, fillers and glass fiber.

In this embodiment, the foregoing substrate 200 is disposed in a movable object, for example, may be disposed in a UAV, an unmanned ground vehicle, a robot, an underwater robot or a ship. It may be understood that, in some implementations, the foregoing substrate 200 may be any insulating component in a movable object (such as a UAV). For example, the substrate 200 may be an arm or a tail wing of the UAV.

The first antenna unit 10 and the second antenna unit 20 are both metal sheets. The two antenna elements may be formed on the surface of the substrate 200 by means of photolithography etching. In other implementations, a metal sheet may be made into the foregoing antenna unit and then fixed on the surface of the foregoing substrate 200. An operating frequency band of the antenna 100 depends on sizes of the first antenna unit 10 and the second antenna unit 200.

The first antenna unit 10 includes a first primary radiation unit 11 and a first secondary radiation unit 12, and the second antenna unit 20 includes a second primary radiation unit 21 and a second secondary radiation unit 22. A preset distance is set between the first primary radiation unit 11 and the second primary radiation unit 21. The first secondary radiation unit 12 is connected to one end of the first primary radiation unit 11 that is away from the second primary radiation unit 21, and the second secondary radiation unit 22 is connected to one end of the second primary radiation unit 21 that is away from the first primary radiation unit 11. Preferably, the first secondary radiation unit 12 and the second secondary radiation unit 22 are located on the same side of the substrate 200. In other implementations, the first secondary radiation unit 12 and the second secondary radiation unit 22 may be located on two sides of the substrate 200 respectively.

The first secondary radiation unit 12 and the second secondary radiation unit 22 are respectively disposed on the ends of the first primary radiation unit 11 and the second primary radiation unit 21 that are far away from each other, so that a current flowing through the first antenna unit 10 and the second antenna unit 20 has a longer effective path, which reduces a size and a height and/or a width of the antenna, thereby achieving miniaturization of the antenna. In this way, the antenna can be mounted in the UAV.

The first primary radiation unit 11 and the second primary radiation unit 21 are disposed in a first direction of the substrate 200, and the first secondary radiation unit 12 and the second secondary radiation unit 22 are disposed in a second direction of the substrate 200. The first direction is not parallel to the second direction. In an implementation, the first direction and the second direction are perpendicular to each other. For example, the first direction is a vertical direction (a Y direction shown in FIG. 1), and the second direction is a horizontal direction (an X direction shown in FIG. 1).

In order to further reduce the spatial size of the antenna 100, a distance from the first secondary radiation unit 12 to the second secondary radiation unit 22 gradually decreases in the horizontal direction (the X direction) of the substrate 200. For example, as shown in FIG. 1, the first secondary radiation unit 12 is disposed in the horizontal direction (the X direction), and the second secondary radiation unit 22 is inclined toward the first secondary radiation unit 12.

Shapes of the first primary radiation unit 11 and the second primary radiation unit 21 may vary accordingly according to different requirements, for example, may be a trapezoid, a rectangle, an ellipse, a cone, a hexagon or the like. The first primary radiation unit 11 and the second primary radiation unit 21 may have the same shape or different shapes. For example, the first primary radiation unit 11 is in a shape of a rectangle, and the second primary radiation unit 21 is in a shape of an ellipse.

In some implementations, when the first primary radiation unit 11 and the second primary radiation unit 21 have the same shape, the first primary radiation unit 11 and the second primary radiation unit 21 are symmetrically disposed in the vertical direction (the Y direction) of the substrate 200, to achieve a more desirable omnidirectional uniform radiation effect.

Exemplarily, the first primary radiation unit 11 is an inverted trapezoidal structure, the second primary radiation unit 21 is a trapezoidal structure, the first secondary radiation unit 12 is formed by extending horizontally one of top corners of the inverted trapezoidal structure, and the second secondary radiation unit 22 is formed by extending obliquely upward one of bottom corners of the trapezoidal structure, so that the distance from the first secondary radiation unit 12 to the second secondary radiation unit 22 gradually decreases in the horizontal direction (the X direction) of the substrate 200.

Figure 2:
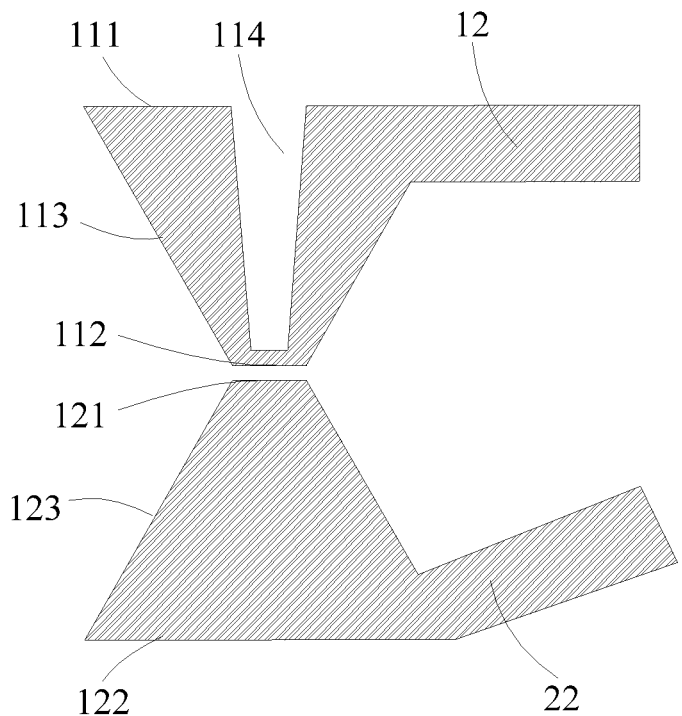
FIG. 2 is a schematic diagram of a first antenna unit and a second antenna unit according to an embodiment of the present invention.

Specifically, as shown in FIG. 2, the first primary radiation unit 11 includes a first upper base 111 and a first lower base 112 parallel to each other and two first side edges 113 connecting the first upper base 111 and the first lower base 112. A length of the first upper base 111 is greater than a length of the first lower base 112. The first secondary radiation unit 12 is formed by extending horizontally the first upper base 111 and one of the first side edges 113. In some implementations, an upper edge of the first secondary radiation unit 12 coincides with an upper edge of the first upper base 111.

The second primary radiation unit 21 includes a second upper base 121 and a second lower base 122 parallel to each other and two second side edges 123 connecting the second upper base 121 and the second lower base 122. A preset distance is set between the second upper base 121 and the first upper base 111. A length of the second upper base 121 is less than a length of the second lower base 122. The second secondary radiation unit 22 is formed by extending obliquely upward the second lower base 122 and one of the second side edges 123.

It should be noted that, in addition to the rectangle shown in the figure, the first secondary radiation unit 12 and the second secondary radiation unit 22 may also be in other shapes, such as a trapezoid, an ellipse, a cone or the like. The first secondary radiation unit 12 and the second secondary radiation unit 22 may have the same shape or different shapes. For example, the first secondary radiation unit 12 is in a shape of a rectangle, and the second secondary radiation unit 22 is in a shape of an ellipse.

In some other implementations, the side edges of the first secondary radiation unit 12 and/or the second secondary radiation unit 22 may also be in a sawtooth shape, a wave shape or other irregular shapes.

In order to adjust an impedance of the antenna 100 so that the antenna 100 has more stable performance, a groove 114 is provided in the first primary radiation unit 11 or the second primary radiation unit 21. As shown in FIG. 2, the groove 114 has an opening away from the other primary radiation unit.

In an implementation, the groove 114 is provided in the first primary radiation unit 11. The groove 114 is formed from one side of the first primary radiation unit 11 that is away from the second primary radiation unit 21 toward the second primary radiation unit 21.

Specifically, an opening of the groove 114 is located at the first upper base 111, a bottom edge of the groove 114 is parallel to the first lower base 112 and is at a specific distance from the first lower base 112, and a width of the groove 114 gradually decreases with a depth of the groove 114, that is, the groove 114 is in a shape of an inverted trapezoid. In other embodiments, the groove 114 may be in a shape of a rectangle, a moon, an ellipse, a trapezoid, an inverted trapezoid or the like. The width and the depth of the groove 114 are not limited in this embodiment, and may be determined according to design optimization.

Figure 3:
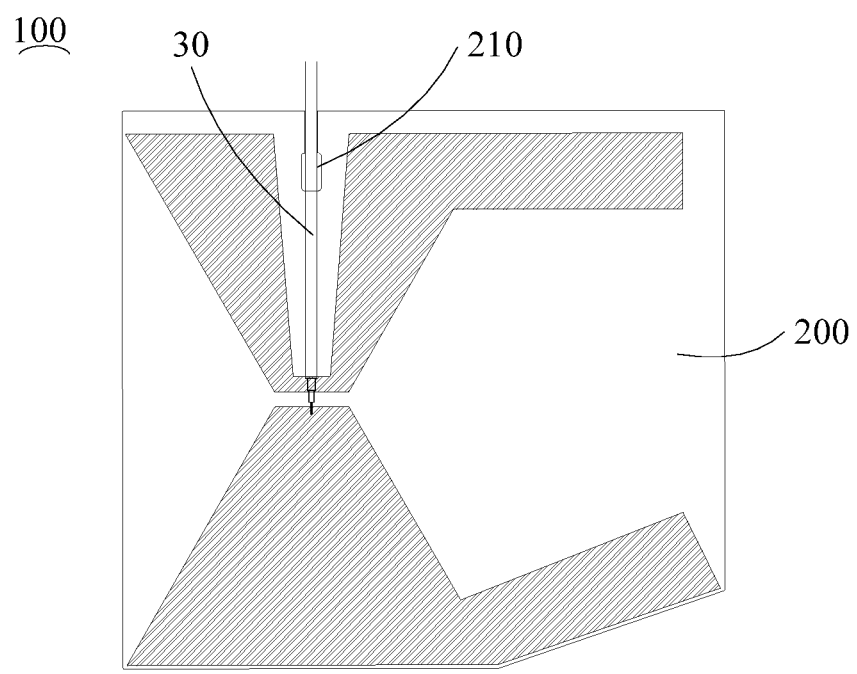
FIG. 3 is a schematic diagram of another antenna according to an embodiment of the present invention.
Figure 4:
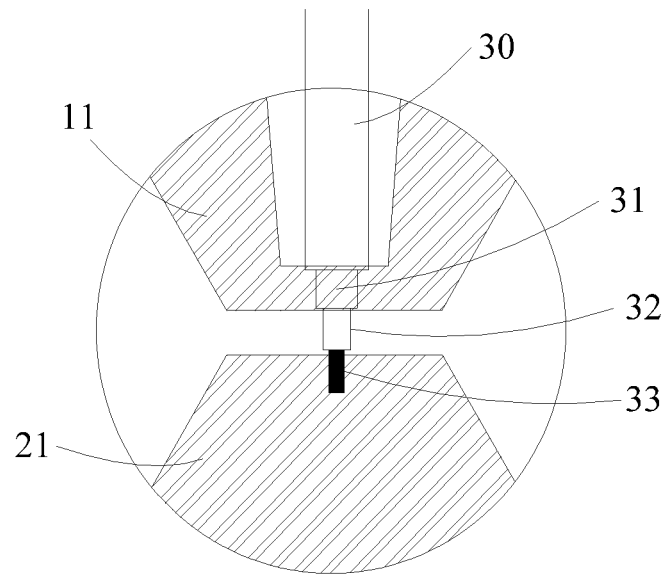
FIG. 4 is a schematic diagram of connection between a feed line and the first antenna unit and the second antenna unit according to an embodiment of the present invention.

As shown in FIG. 3 to FIG. 4, the antenna 100 further includes a feed line 30. The feed line 30 is located in the groove 114. Optionally, the substrate 200 has a bayonet 210 in an area corresponding to the groove 114. The bayonet 210 is configured to fix the feed line 30 in the groove 114.

An outer covering and a braided layer at one end of the feed line 30 may be stripped off to obtain an outer conductor 31, and then a transparent insulating film layer 32 may be stripped off to obtain an inner conductor 33. The inner conductor 33 is connected to one end of the second primary radiation unit 21 that is close to the first primary radiation unit 11, and the outer conductor 31 is connected to one end of the first primary radiation unit 11 that is close to the second primary radiation unit 21.

It may be understood that when the groove 114 is provided in the second primary radiation unit 21, the outer conductor 31 is connected to one end of the second primary radiation unit 21 that is close to the first primary radiation unit 11, and the inner conductor 33 is connected to one end of the first primary radiation unit 11 that is close to the second primary radiation unit 21.

Figure 5:
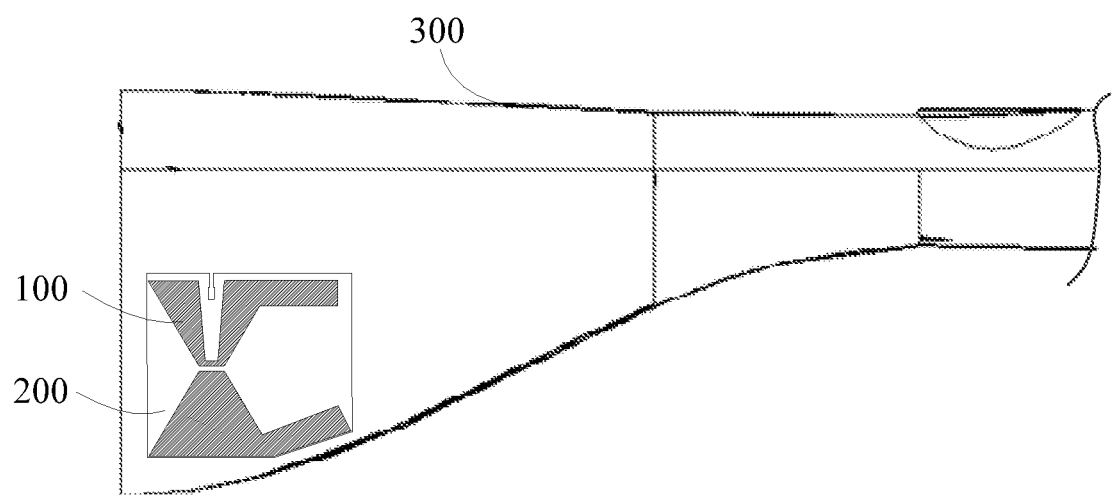
FIG. 5 is a schematic diagram of an antenna mounted in a UAV according to an embodiment of the present invention.

When the second secondary radiation unit 22 is formed by extending obliquely upward one of bottom corners of the trapezoidal structure, the antenna 100 may be directly disposed in internal space of the movable object. For example, as shown in FIG. 5, the antenna 100 may be disposed in a tail wing of a UAV 300, so that the antenna 100 is conformal with the internal structure of the UAV 300.

Figure 6:
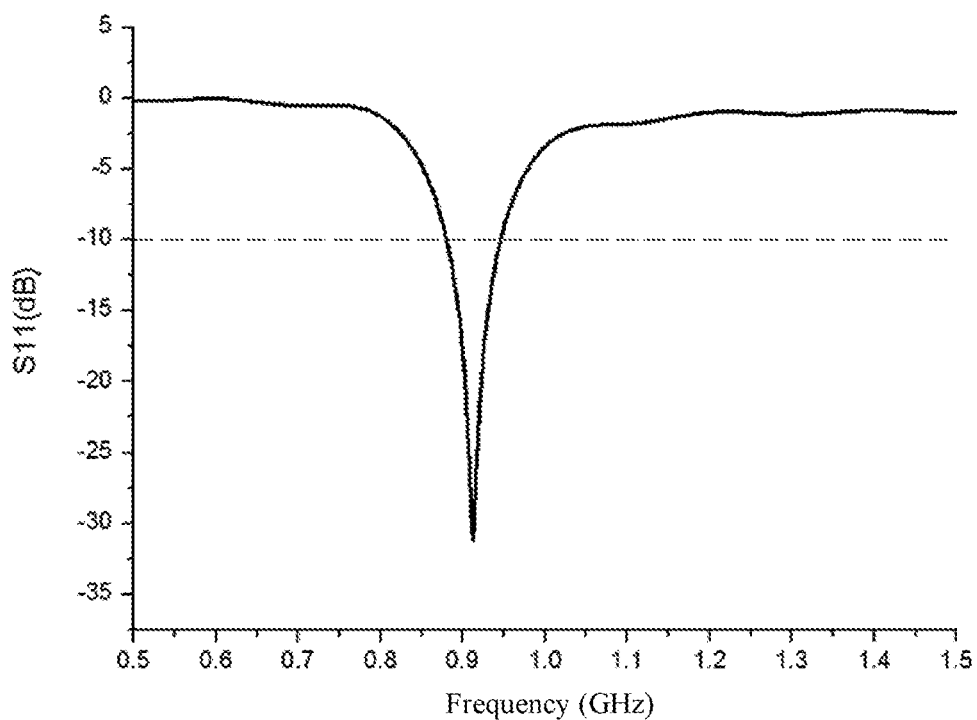
FIG. 6 is a schematic diagram of scattering parameters of an antenna according to an embodiment of the present invention.

Referring to FIG. 6, the antenna 100 provided in the embodiments can work at 860 MHz to 960 MHz with a bandwidth of 100 MHz, which can satisfy coverage of a commonly used 900 MHz frequency band.

Figure 7:
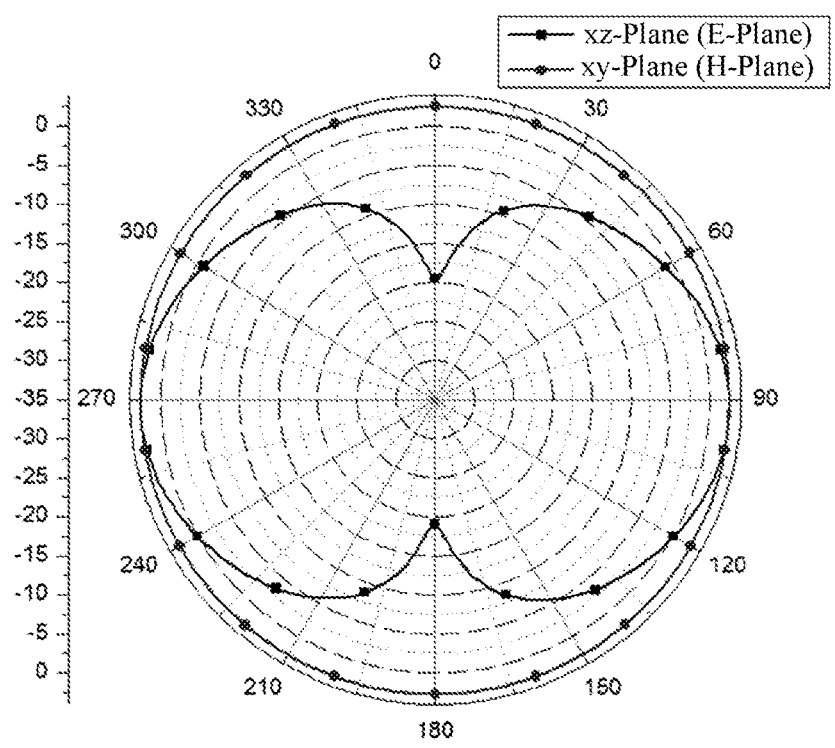
FIG. 7 is a direction diagram of an antenna at 900 MHz according to an embodiment of the present invention.

Referring to FIG. 7, the antenna 100 provided in the embodiments has a horizontal direction in a 900 MHz maximum radiation direction, which can substantially achieve omnidirectional coverage, has a height of 70 mm, which is significantly lower than that of a conventional 900 MHz antenna (which is 42% of the height of the conventional 900 MHz antenna), and has a thickness of only 0.7 mm.

In some implementations, the operating frequency band of the antenna 100 is 900 MHz. In some other implementations, the antenna 100 is applicable to other wireless communication frequency bands.

The embodiments further provide a UAV. The antenna 100 may be disposed in the UAV. The substrate 200 of the antenna 100 may be any insulating component in the UAV. In some implementations, the UAV is a vertical take-off and landing fixed-wing UAV, and the antenna 100 is disposed in a tail wing of the UAV.

It should be noted that, the specification of the present invention and the accompanying drawings thereof illustrate preferred embodiments of the present invention. However, the present invention can be implemented in various different forms, and is not limited to the embodiments described in the present invention. These embodiments are not intended to be an additional limitation on the content of the present invention, and are described for the purpose of providing a more thorough and comprehensive understanding of the content disclosed in the present invention. Moreover, the above technical features can further be combined to form various embodiments not listed above, and all such embodiments shall be construed as falling within the scope of the present invention. Further, persons of ordinary skill in the art may make improvements and variations according to the above descriptions, and such improvements and variations shall all fall within the protection scope of the appended claims of the present invention.

What is claimed is:

1. An antenna, disposed in an unmanned aerial vehicle (UAV), the antenna comprising:
   a first antenna unit; and
   a second antenna unit, the first antenna unit and the second antenna unit being disposed on the same surface of a substrate; wherein
   the first antenna unit comprises a first primary radiation unit and a first secondary radiation unit, and the second antenna unit comprises a second primary radiation unit and a second secondary radiation unit, a gap existing between the first primary radiation unit and the second primary radiation unit; and
   the first secondary radiation unit is connected to one end of the first primary radiation unit that is away from the second primary radiation unit, the second secondary radiation unit is connected to one end of the second primary radiation unit that is away from the first primary radiation unit, and the first secondary radiation unit and the second secondary radiation unit are located on the same side of the substrate;
   the first primary radiation unit is an inverted trapezoidal structure, the second primary radiation unit is a trapezoidal structure, the first secondary radiation unit is formed by extending horizontally one of top corners of the inverted trapezoidal structure, and the second secondary radiation unit is formed by extending obliquely upward one of bottom corners of the trapezoidal structure.

2. The antenna according to claim 1, wherein
   the first primary radiation unit and the second primary radiation unit are disposed in a first direction of the substrate, and the first secondary radiation unit and the second secondary radiation unit are disposed in a second direction of the substrate, the first direction being not parallel to the second direction.

3. The antenna according to claim 2, wherein
   the first direction is a vertical direction of the substrate, and the second direction is a horizontal direction of the substrate.

4. The antenna according to claim 3, wherein
   a distance from the first secondary radiation unit to the second secondary radiation unit gradually decreases in the horizontal direction of the substrate.

5. The antenna according to claim 3, wherein
   the first primary radiation unit and the second primary radiation unit are symmetrically disposed in the vertical direction of the substrate.

6. The antenna according to claim 1, wherein
   the first primary radiation unit or the second primary radiation unit has a groove formed thereon, the groove having an opening away from the other primary radiation unit.

7. The antenna according to claim 6, further comprising:
   a feed line located in the groove.

8. The antenna according to claim 7, wherein
   the feed line comprises an outer conductor and an inner conductor; and
   the groove is provided in the first primary radiation unit, the inner conductor is connected to one end of the second primary radiation unit that is close to the first primary radiation unit, and the outer conductor is connected to one end of the first primary radiation unit that is close to the second primary radiation unit.

9. The antenna according to claim 1, wherein
   the first antenna unit and the second antenna unit are both metal sheets.

10. A UAV, having a substrate disposed therein, the substrate having an antenna disposed thereon, the antenna comprising:
    a first antenna unit; and
    a second antenna unit, the first antenna unit and the second antenna unit being disposed on the same surface of a substrate; wherein
    the first antenna unit comprises a first primary radiation unit and a first secondary radiation unit, and the second antenna unit comprises a second primary radiation unit and a second secondary radiation unit, a gap existing between the first primary radiation unit and the second primary radiation unit; and
    the first secondary radiation unit is connected to one end of the first primary radiation unit that is away from the second primary radiation unit, the second secondary radiation unit is connected to one end of the second primary radiation unit that is away from the first primary radiation unit, and the first secondary radiation unit and the second secondary radiation unit are located on the same side of the substrate;
    the first primary radiation unit is an inverted trapezoidal structure, the second primary radiation unit is a trapezoidal structure, the first secondary radiation unit is formed by extending horizontally one of top corners of the inverted trapezoidal structure, and the second secondary radiation unit is formed by extending obliquely upward one of bottom corners of the trapezoidal structure.

11. The UAV according to claim 10, wherein the UAV is a vertical take-off and landing fixed-wing UAV; and
    the substrate and the antenna are disposed in a tail wing of the UAV.

* * * * *